Jan. 10, 1956     P. G. PALMGREN     2,730,414
SPHERICAL ROLLER BEARING FOR ROCKING RAILWAY JOURNAL BOX
Filed May 13, 1952     2 Sheets-Sheet 1
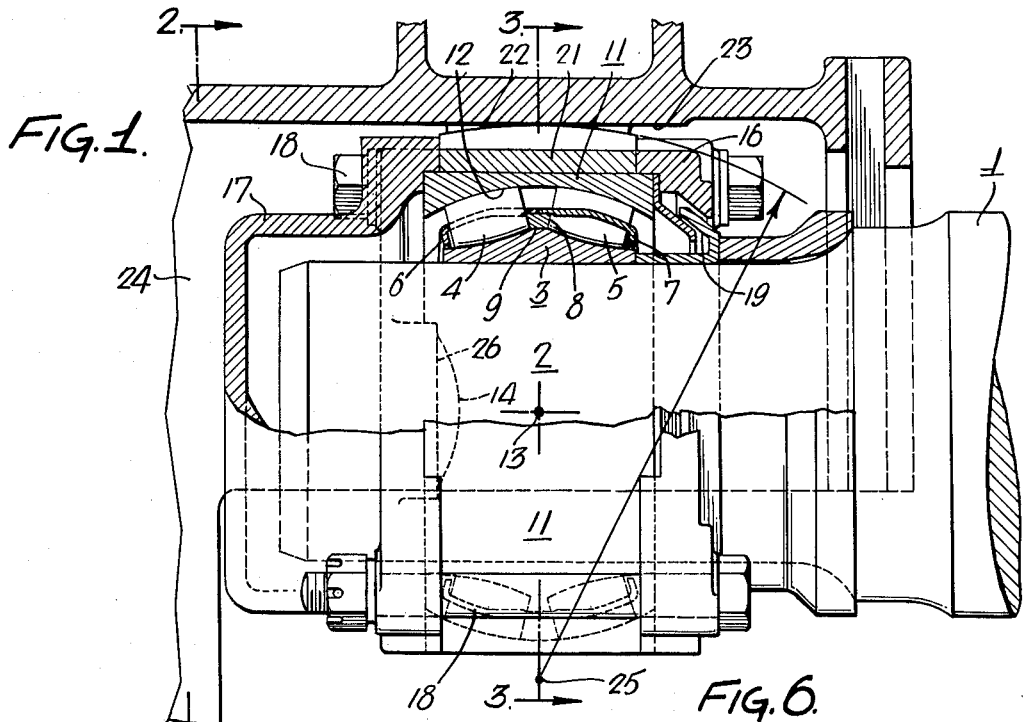
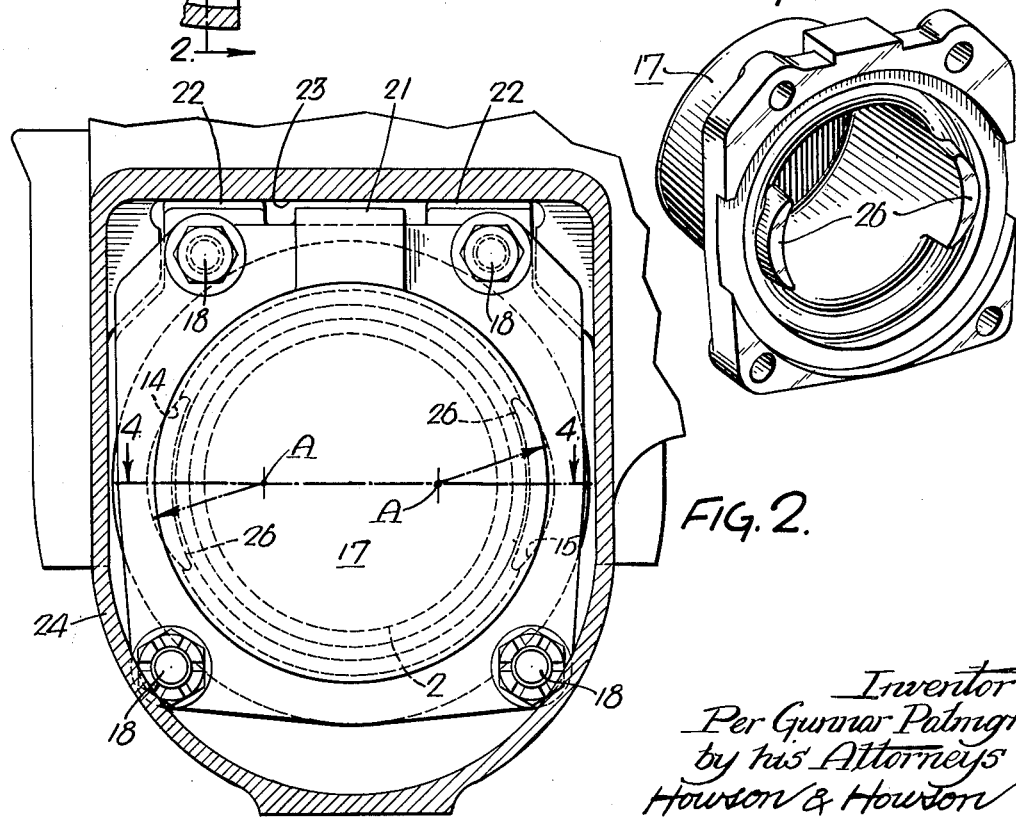
Inventor:
Per Gunnar Palmgren
by his Attorneys
Howson & Howson

United States Patent Office 2,730,414
Patented Jan. 10, 1956

2,730,414

SPHERICAL ROLLER BEARING FOR ROCKING RAILWAY JOURNAL BOX

Per Gunnar Palmgren, Philadelphia, Pa., assignor to SKF Industries, Inc., Philadelphia, Pa., a corporation of Delaware Application May 13, 1952, Serial No. 287,574

10 Claims. (Cl. 308—180)

This invention relates to an adaptation of spherical roller bearings to spaces too restricted radially to accommodate conventional designs, and a principal object of the invention is to provide a bearing of this type, which, by reason of certain novel structure hereinafter described is adapted for application to standard railway journal boxes, and also to the type of frame having pedestal openings which, because of limited width, limit permissible bearing diameters.

The invention resides also in certain structural details of the journal box assembly which includes the aforesaid spherical bearing; and in novel structural details of the bearing itself apart from the journal box environment in which it finds an application of major utility.

In the attached drawings:

Figure 1 is a fragmentary axial cross sectional view of a railway axle equipped with a spherical roller bearing according to the invention within a standard freight car journal box of the type cast integrally with the side frame;

Figure 2 is a sectional view on the line 2—2 of Figure 1;

Figure 6 is a view in perspective of one of the elements of the journal casing.

Figure 3:
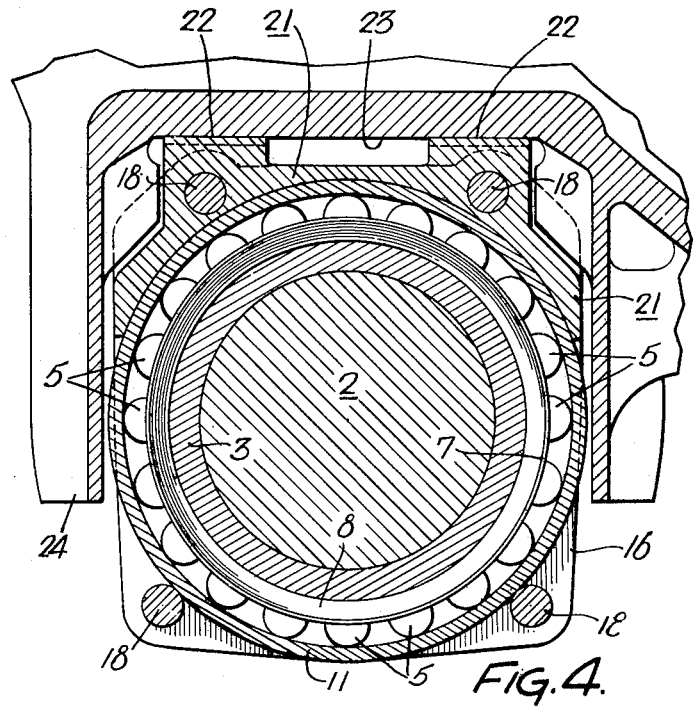
Figure 3 is a sectional view on the line 3—3 of Figure 1.

In my co-pending application Serial No. 169,357, filed June 21, 1950, I have disclosed a railway journal box assembly which includes a spherical roller bearing for the axle journal and in which I have utilized the self-aligning properties of such bearings to afford the axle a desirable freedom for limited axial movements. In that instance, the journal box was not conventional and the bearing was not adapted for use in boxes of the conventional form. The conventional box was designed for plain bearings comprising brass pillows laid on top of the axle journal and secured in place by wedge means interposed between the pillow and the confronting inner wall surfaces of the box. Such plain bearings occupy less radial space than the conventional large diameter short roller type of anti-friction bearing suitable to installations having less rigid space restriction in the radial direction. As previously stated, the present invention provides an anti-friction bearing of the spherical roller type which will fit the space in the conventional journal box designed for reception of plain bearings or in journal boxes of limited pedestal opening, and which, at the same time, will have satisfactory load carrying capacity and endurance.

In order to provide a two-row spherical roller bearing capable of fitting the aforesaid restricted space and at the same time having a load capacity capable of carrying the freight car loads for satisfactorily long periods, I have employed longer rollers of less diameter than those of the conventional two-row bearing. Every increase in length of the rollers, however, requires twice the same increase in the axial width of the outer ring of the bearing in order to afford a spherical outer race way of sufficient width not only to embrace the two-rows of rollers, the intervening guide ring, and the two cages, but also to allow for the circular swinging of the outer race ring over the rollers required for exercise of the said self-aligning characteristic which is relied upon in part to afford the necessary freedom for the aforesaid axial movement of the axle. This increase in the width of the outer ring creates a difficult problem in putting the bearing together, because the increase in width also entails a reduction of the inner diameter of the outer edges of the outer race ring which soon becomes too small to admit the cages and the guide ring by sidewise entrance in the normal fashion.

The problem will be more readily understood by reference to Figure 1 of the drawings wherein the numeral 1 designates the axle, and 2, the axle journal. Numeral 3 indicates the inner race ring of the two-row spherical roller bearing, the rollers of which rows are designated respectively by the reference numerals 4 and 5. The rollers of the two rows are maintained in suitably spaced relation by cages 6 and 7 respectively; and the inner confronting ends of the rollers are separated by a guide ring 8, which rides on a cylindrical surface or land 9 at the center of the inner ring 3. The outer ring of the bearing is designated by the reference numeral 11, and this ring contains the spherical race 12 which is common to the rollers of both rows, so that the ring may pivot about the center 13 of the bearing, which in assembly also constitutes the center of the sphere defined by the outer race way 12. Insofar as described above, the bearing is conventional and its construction and functional characteristics will be well understood by those familiar with the art. The bearing, however, departs from the conventional in that the rollers 4 and 5 are relatively long and of relatively small diameter, and the race rings 3 and 11 are correspondingly relatively wide in the axial dimension. The bearing departs from the conventional in certain other respects hereinafter described. It will be noted, however, that by reason of the increased axial width of the outer ring the internal diameter of this ring at the ends thereof are less than the greatest diameters of the guide ring 8 and of the cages 6 and 7, and are too small to admit these elements to the interior of the ring.

Figure 4:
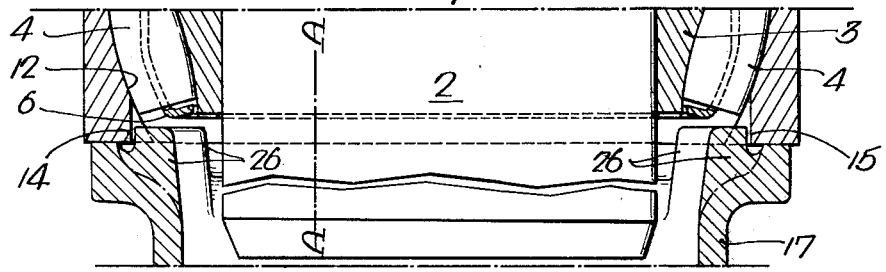
Figure 4 is an enlarged fragmentary sectional view on the line 4—4 of Figure 2.

In accordance with the present invention, I provide the outer ring with two assembly notches 14 and 15 located at one end of the ring and 180° apart as illustrated in the drawings. These notches may be of cylindrical contour, the axis of the cylinder lying parallel to the axis of the ring and being of lesser radius. In Figure 4, the axis of the notch 14 is represented by the line A—A, and in Figure 2 by the letter A. The radius of the cylinder is sufficiently great to form a notch that will clear the largest diameter of the cages and of the ring 8 but which shall not spread the notch wider than necessary to perform the function of admitting these elements to the interior of the ring.

Figure 5:
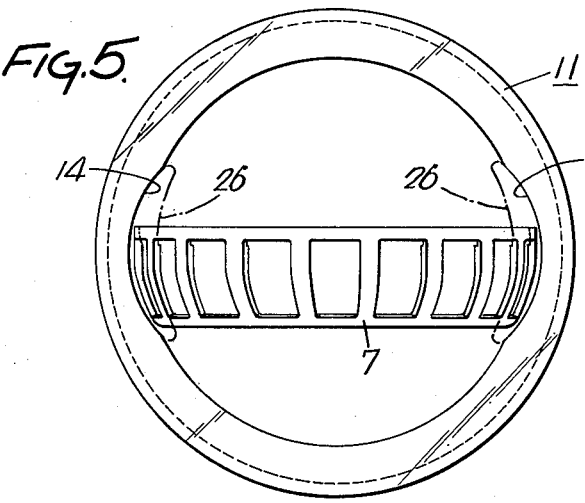
Figure 5 illustrates one cage of the bearing entering the outer race ring edgewise through assembly notches provided in accordance with the invention for that purpose.

The effective width of the notch in relation to the cage is best illustrated in Figure 5, which shows one of the cages in position for insertion through the notches into the interior of the ring. As therein illustrated, the cage is presented to the notches edgewise and the dimension of the notches is such as to admit the cage with minimum clearance. After introduction to the interior of the ring, the cage may be turned through an angle of 90° to its normal position as illustrated in Figure 1. The guide ring 8 is insertable in the ring through the notches 14 and 15 in like manner.

In assembling the bearing, the cage 7 may first be inserted through the notches 14 and 15 in the position shown in Figure 5 and after insertion may be turned through an angle of 135° so that the small end of the cage will project in part through the opposite or unnotched end of the ring and the larger end will be presented angularly toward the central plane of the ring. The cage 6 may then be inserted in like manner, and after rotation through an angle of 45° may be moved into the far end of the ring on the opposite side from the cage 7 and with its larger end also presented angularly toward the center plane of the ring. In this position the planes of the two cages will lie in an angle to each other of approximately 90° and both cages will lie in the unnotched end of the ring at the opposite sides of the latter. The guide ring 8 may now be inserted in like manner followed by the inner race ring 3 which may be inserted in the normal position. The cage 6 can now be manipulated so as to pass the larger end thereof around the trailing end of the inner race ring, and the cage 7, similarly adjusted, embraces the leading end. The guide ring 9 will occupy its normal position on the cylindrical mid-section of the inner race ring embraced by the inner and larger ends of the two cages. This is the position in which the elements are illustrated in Figure 1.

To complete the assembly, the rollers are inserted in the cages in the conventional manner by first turning the inner assembly including the inner ring, the cages, and the guide ring, until a pocket of one cage is exposed outside of the outer ring to an extent permitting insertion radially of a roller. Each of the pockets of the respective cages is exposed in this manner for insertion of its roller. Preferably the individual pocket will be slightly narrower than the major diameter of the roller and the side of the pocket will be slightly resiliently sprung when the roller is forcibly inserted so that the rollers after insertion will be retained in the cage.

To afford a bearing of maximum diameter within the limited space available within the standard journal box or within restricted pedestal openings, and to thereby increase the capacity of the bearing, I provide a casing for the bearing which includes the outer race ring 11 as a part thereof in accordance with the principle disclosed in my co-pending application Serial No. 218,714, filed April 2, 1951. Thus the bearing housing comprises the two axially spaced cover elements 16 and 17 between which the ring 11 is clamped by means of bolts 18. The cover element 17 embraces the terminal end of the journal 2 and forms with the outer race ring and the annular cover member 16 a housing which supports and protects the bearing. Suitable sealing means, designated generally by the reference numeral 19, is provided between the inner peripheral edge of the casing member 16 and the journal, as in the bearings disclosed in the aforesaid application Serial No. 218,714.

A block 21 at the top of the casing, also in accordance with the principles disclosed in my aforesaid co-pending application 218,714, and held in position on the outer race ring 11 by the bolts 18, as shown in Figure 3 and is provided with an upper curved rocking surface 22 which forms a seat for the confronting surface 23 of the journal box 24, this box being of the conventional form previously set forth, designed for use of plain bearings. In accordance with the principles described in my co-pending application 169,357, the radius of the rocking surface 23 is such that its center, indicated by the reference numeral 25 in Figure 1, lies below the center 13 of the bearing. This rocking surface in conjunction with the self-aligning property of the spherical bearing, affords freedom for axial movements of the axle 1 with respect to the side frame.

It will be noted by reference to Figure 1 that the end of each of the rollers 4 of the left-hand row will pass in succession over the inner ends of the assembly notches 14 and 15. If the roller at that instant should be directly under heavy load, its contact ellipse could overlap the inner edge of the notch, and this would impose excessive stresses on roller and race at the edge of such overlap that would tend to produce premature failure. To eliminate this possibility, I place the outer ring so that notches are at the sides of the journals, as illustrated, or 90° removed from the point of maximum load application, and I provide lugs 26, 26 on the inside of the front cover 17 which project into the assembly notches and act as stops to prevent creeping of the outer ring away from its original position wherein radial dead load cannot come upon the edges of the notches. Fixing of the outer ring with notches disposed in this position makes possible reversal of the outer race ring in case of bearing failure in its upper half so as to bring the undamaged lower half of the race surface to the top.

Figure 7:
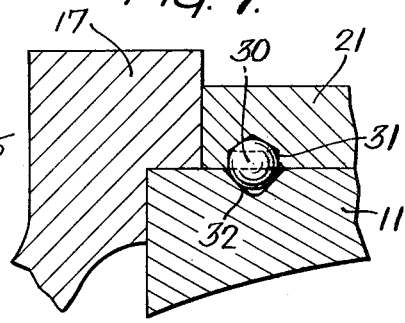
Figure 7 is a fragmentary sectional view taken on the same line as Figure 1 and illustrating a modification within the scope of the invention.

Another preferred arrangement for preventing creeping of the outer ring of the bearing and consequent displacement of the assembly notches from their proper positions described above, is illustrated in Figure 7. In this case, a small metallic sphere 30 is press fitted into a hole 31 in the underside of the block 21, the hole being only slightly deeper than the radius of the sphere so that the latter projects nearly half of its diameter beyond the surface of the block. A hole 32 is provided in the top of the outer ring 11 to receive the projecting portion of the sphere. The sphere is closely embraced by the cavity formed by the registering holes 31 and 32, but the latter are of such effective depths that the sphere is free from radial load. Obviously, the sphere prevents relative rotational movement between the block and the ring.

The sphere also prevents relative axial movements between the block and ring during assembly, as when for example the inner ring 3 of the bearing (see Figure 1) is being pressed onto the axle journal. In this operation the outer ring 11 moves axially with the inner ring, and by immobilizing the block 21 with respect to the outer ring the block is prevented from moving ahead of the outer ring and thereby displacing the inner cover 16 from the end of the ring with resulting possible damage to the sealing elements 19.

It will be apparent that the bearing ring 11 may have a second hole corresponding to the hole 32 and 180° removed from the latter, for registration with the sphere 30 when the ring 11 will have been turned through a corresponding angle for the purpose previously described. Obviously, the element 30 might take other than spherical form without departing from the invention.

Spherical roller bearings equipped with assembly notches in accordance with the present invention will find utility in other than railroad application, such for example, in rolling mills, where similar problems of heavy duty conditions and limited radial bearing space frequently occur.

I claim:

1. A railway journal box and axle assembly comprising in combination a spherical roller bearing fitted to an axle journal and including two rows of rollers and an outer race ring having a spherical raceway for the rollers of both rows, elements secured at the ends of said ring and forming with the latter a casing independent of the journal box and enclosing said rollers, and means on said casing affording a seat for the journal box.

2. A railway journal box and axle assembly according to claim 1 wherein the seat means comprises a bearing for said box affording a relative rocking movement of the box and casing approximately in a vertical plane containing the journal axis.

3. A railway journal box and axle assembly according to claim 1 wherein the bearing comprises an annular cage for the rollers of each row, the length of said rollers exceeding their diameters to an extent such that the largest diameter of said cages is in excess of the diameter of the inner end edges of the ring, and a pair of assembly notches at opposite sides respectively of and at one end of said ring for admission of said cages to the interior of the latter.

4. A railway journal box and axle assembly according to claim 3 wherein the seat means comprises a bearing for the box affording relative rocking movement of the box and casing approximately in a vertical plane containing the journal axis, and wherein further the said race ring is disposed so that the assembly notches lie respectively at opposite sides of and approximately equidistant from the said rocking bearing.

5. A railway journal box and axle assembly according to claim 4 including means for positively retaining the ring in the said disposed position.

6. A railway journal box and axle assembly according to claim 5 wherein the said retaining means comprises stop means on one of the said casing elements engaging the said notches, and means for preventing angular movement of said element in the journal box about the axis of the journal.

7. A spherical roller bearing comprising inner and outer race rings, two rows of rollers finding a common spherical race in the outer ring and an annular cage for the rollers of each row, the length of said rollers exceeding their diameters to an extent such that the largest diameter of said cages is in excess of the inner diameter of the end edge of the ring, and a pair of assembly notches at opposite sides respectively of said ring for admission of said cages to the interior of the latter.

8. A railway journal box and axle assembly according to claim 1 wherein the said bearing comprises two rows of rollers finding a common spherical race in the outer ring and an annular cage for the rollers of each row, the length of said rollers exceeding their diameters to an extent such that the largest diameter of said cages is in excess of the inner diameter of the end edge of the ring, a pair of assembly notches at opposite sides respectively of said ring for admission of said cages to the interior of the latter, and interlocking means between the ring and the said casing for positively preventing displacement of the ring in the casing.

9. A railway journal box and axle assembly according to claim 8 wherein the said interlocking means comprises a locking element confined within a cavity-forming registering recesses in confronting surfaces of the ring and casing.

10. A railway journal box and axle assembly according to claim 9 wherein the said ring is provided with two of the said recesses located in the same radial plane and 180° removed from each other about the axis of the bearing.

References Cited in the file of this patent

UNITED STATES PATENTS

| | | |
|---|---|---|
| 1,800,246 | Bronander | Apr. 14, 1931 |
| 1,862,641 | Turner | June 14, 1932 |
| 2,397,164 | Shafer | Mar. 26, 1946 |
| 2,426,963 | Ball | Sept. 2, 1947 |
| 2,438,214 | Horger | Mar. 23, 1948 |

FOREIGN PATENTS

| | | |
|---|---|---|
| 483,625 | Great Britain | Apr. 22, 1938 |
| 945,700 | France | May 11, 1949 |